(12) United States Patent
Li

(10) Patent No.: US 9,080,761 B2
(45) Date of Patent: Jul. 14, 2015

(54) LED ILLUMINATION LAMP WITH HEAT DISSIPATION UNIT

(75) Inventor: Fuwen Li, Fujian (CN)

(73) Assignee: LEELEDS LIGHTING (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 14/234,150

(22) PCT Filed: Mar. 19, 2012

(86) PCT No.: PCT/CN2012/072538
§ 371 (c)(1),
(2), (4) Date: Jan. 22, 2014

(87) PCT Pub. No.: WO2013/013514
PCT Pub. Date: Jan. 31, 2013

(65) Prior Publication Data
US 2014/0167593 A1    Jun. 19, 2014

(30) Foreign Application Priority Data
Jul. 28, 2011    (CN) .......................... 2011 1 0217294

(51) Int. Cl.
*F21V 29/00* (2015.01)
*F21K 99/00* (2010.01)
*F21V 3/02* (2006.01)
*F21V 29/506* (2015.01)
(Continued)

(52) U.S. Cl.
CPC ............. *F21V 29/2275* (2013.01); *F21K 9/135* (2013.01); *F21V 3/02* (2013.01); *F21V 29/004* (2013.01); *F21V 29/20* (2013.01); *F21V 29/506* (2015.01); *F21V 29/713* (2015.01); *F21V 29/507* (2015.01); *F21V 29/773* (2015.01); *F21Y 2101/02* (2013.01); *F21Y 2105/001* (2013.01)

(58) Field of Classification Search
CPC . F21V 29/2275; F21V 29/713; F21V 29/506; F21V 29/20; F21V 29/004; F21V 29/507; F21V 29/773; F21V 3/02; F21K 9/135
See application file for complete search history.

(56) References Cited

U.S. PATENT DOCUMENTS

| 2008/0186704 A1 | 8/2008 | Chou et al. |
| 2010/0073944 A1 | 3/2010 | Chen |

(Continued)

FOREIGN PATENT DOCUMENTS

| CN | 102052593 A | 5/2011 |
| CN | 102135262 A | 7/2011 |

(Continued)

OTHER PUBLICATIONS

International Search Report of PCT Application No. PCT/CN2012/072538.

(Continued)

*Primary Examiner* — Anne Hines

(57) ABSTRACT

An LED illumination lamp includes a lamp shell, a light emitting unit, a heat transfer substrate, and a heat dissipation unit. The light emitting unit is mounted on the heat transfer substrate. The lamp shell covers the light emitting unit. The heat dissipation unit includes a heat transfer rod. One end of the heat transfer rod is thermally connected to the heat transfer substrate, and the other end of the rod is thermally connected to the lamp shell for transferring heat from the heat transfer substrate to the lamp shell. The illumination LED lamp has the advantages of high heat dissipation efficiency.

17 Claims, 6 Drawing Sheets

(51) Int. Cl.
*F21V 29/71* (2015.01)
*F21Y 101/02* (2006.01)
*F21Y 105/00* (2006.01)
*F21V 29/507* (2015.01)
*F21V 29/77* (2015.01)

(56) References Cited

U.S. PATENT DOCUMENTS

2010/0259942 A1 10/2010 Lee
2011/0170297 A1 7/2011 Hockel

FOREIGN PATENT DOCUMENTS

DE 102010001047 A1 7/2011
WO 2010097721 A1 9/2010

OTHER PUBLICATIONS

1st Office Action of counterpart Chinese Patent Application No. 201110217294.X issued on Nov. 22, 2012.
Communication of counterpart European Patent Application No. 12818320.9 issued on Aug. 20, 2014.

LED ILLUMINATION LAMP WITH HEAT DISSIPATION UNIT

TECHNICAL FIELD

The present invention relates to LED lamps, particularly to an LED illumination lamp.

BACKGROUND

LED light sources have advantages of high luminous efficiency, low heat generating, energy saving and long span-life, and thus are widely used. Light generated by single LED light source is low, and thus needs a plurality of LED light source to be packaged together to improve optical flux for lighting. The LED light sources mounted together generate a lot of heat. The heat concentrates in small spaces and is difficult to dissipate. If temperature of the LED is too high, illumination of the LED will decay rapidly, finally life-span of the LED lamp is greatly shortened.

For reducing working temperature of the LED lamp, COB-type LED lamp is disclosed in the art with LED light sources directly fixed on an end surface of a heat transfer substrate of the LED lamp, and the heat transfer substrate is thermally connected to a heat sink of the LED lamp. However, such COB-type LED lamp reduces overheating just by improving heat conductivity, and heat dissipation thereof depends only on the heat sink under the heat transfer substrate, ways for heat dissipation is single, heat dissipation efficiency is limited, and thus may still unable to reduce the working temperature of the LED lamp.

SUMMARY

From above, it is necessary to provide an LED illumination lamp with high heat dissipation efficiency.

An LED illumination lamp includes a lamp shell, a light emitting unit, a heat transfer substrate, and a heat dissipation unit. The light emitting unit is mounted on the heat transfer substrate. The lamp shell covers the light emitting unit. The heat dissipation unit includes a heat transfer rod. One end of the heat transfer rod is connected to the heat transfer substrate, and the other end of the rod is connected to the lamp shell for transferring heat from the heat transfer substrate to the lamp shell.

Compared with the prior art, the LED illumination lamp of the present invention includes a heat transfer rod which thermally interconnects the heat transfer substrate and the lamp shell to transfer heat from the heat transfer substrate to the lamp shell, thus has enlarged heat dissipation area and increased heat dissipation ways, such that the present illumination LED lamp has the advantages of high heat dissipation efficiency.

DETAILED DESCRIPTION OF EMBODIMENTS

The present invention will be described in detail with reference to the drawings and embodiments.

Figure 1:
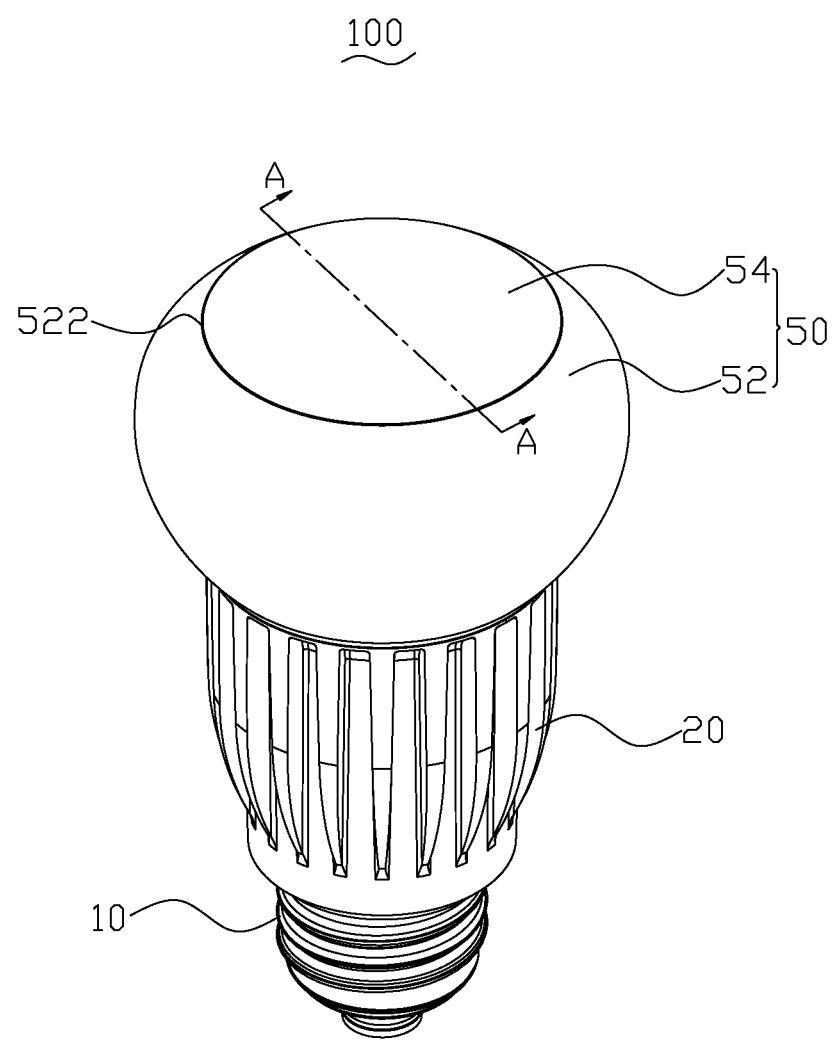
FIG. 1 is a schematic view of an LED illumination lamp in accordance with a first embodiment of the present invention.
Figure 2:
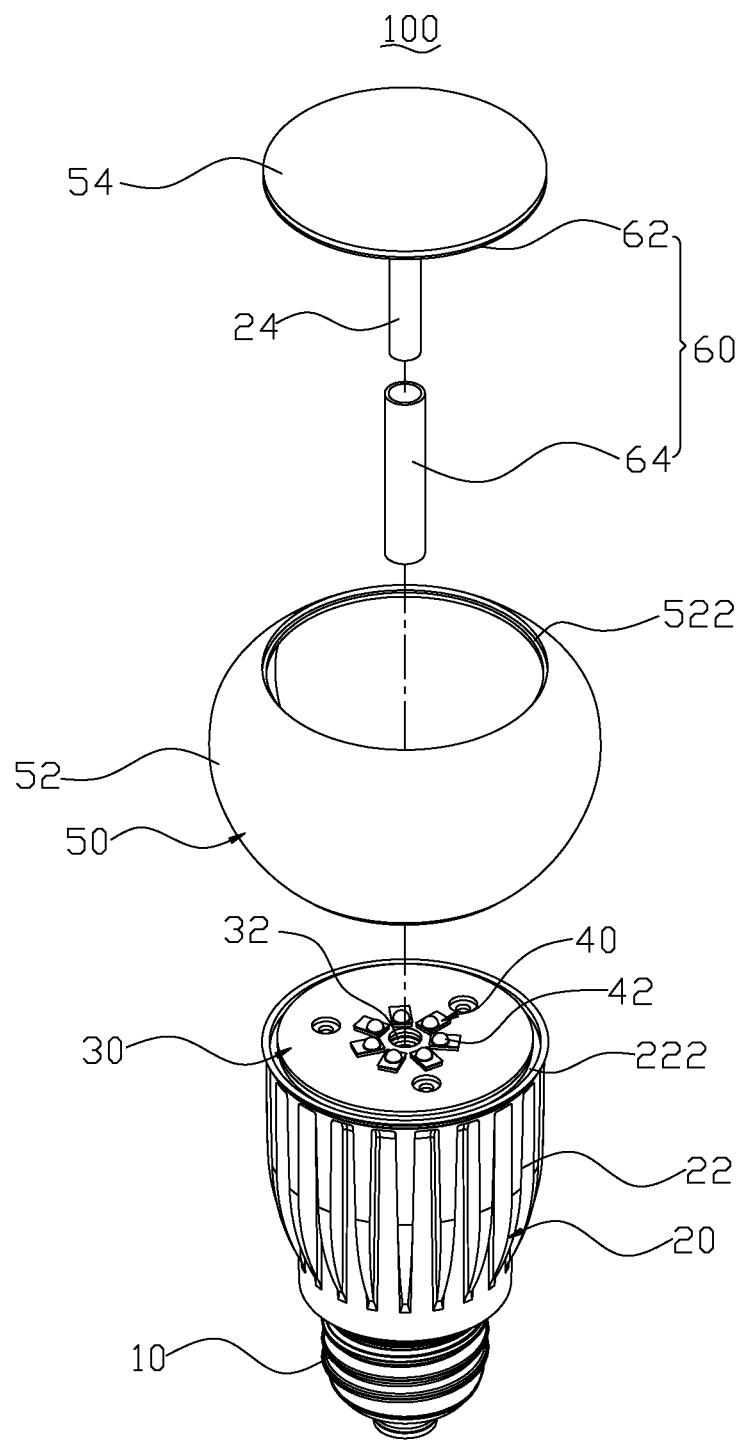
FIG. 2 is an exploded view of the LED illumination lamp of FIG. 1.
Figure 3:
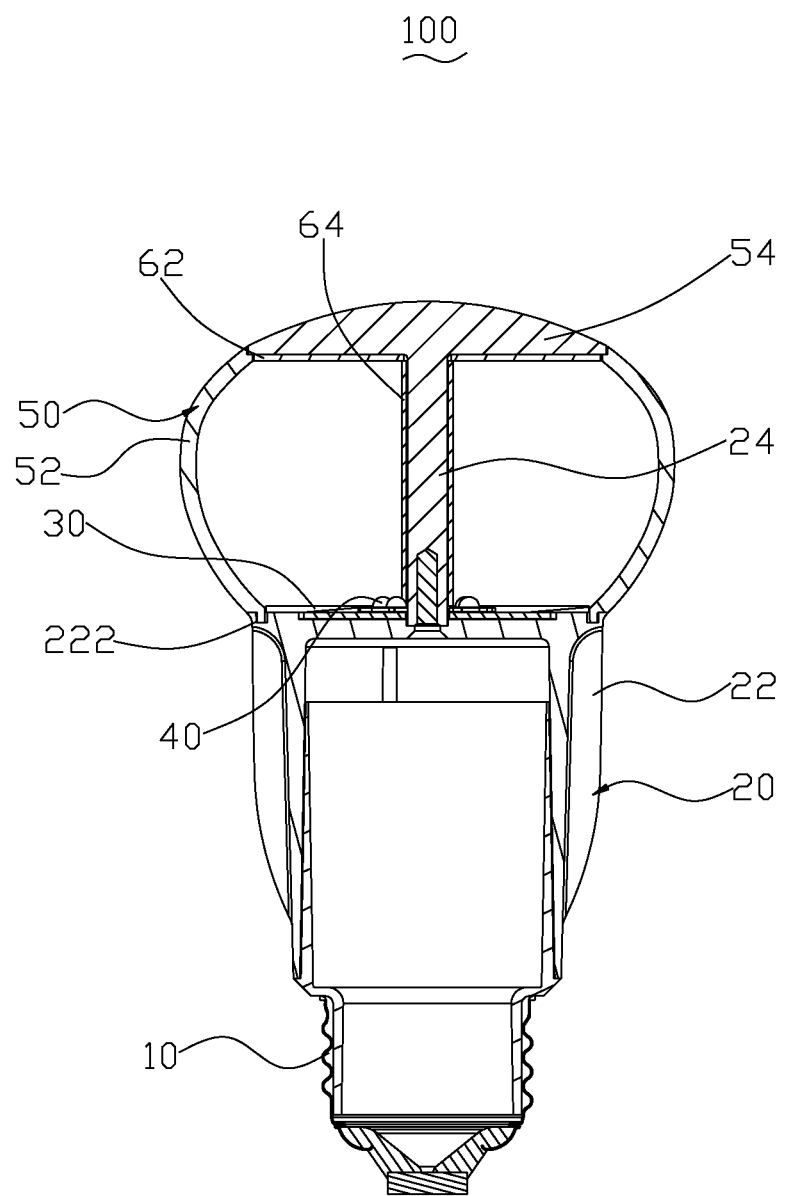
FIG. 3 is a cross section of FIG. 1 taken along line A-A.

An LED illumination lamp 100 according to a first embodiment of the present invention is shown in FIG. 1 to FIG. 3.

Referring to FIG. 1 and FIG. 2, the LED illumination lamp 100 includes a lamp holder 10, a heat dissipation unit 20, a heat transfer substrate 30, a light emitting unit 40, a lamp shell 50 and a reflecting unit 60. The light emitting unit 40 is mounted on the heat transfer substrate 30. The lamp shell 50 covers the light emitting unit 40 and the heat transfer substrate 30, separating the light generating unit and the heat transfer substrate 30 from the environment, ensuring that the LED illumination lamp 100 operates safely and stably.

Please referring to FIG. 2 and FIG. 3, the heat dissipation unit 20 includes a heat sink 22 and a heat transfer rod 24. The heat sink 22 is a conventional fin-type heat sink. A bottom of the heat sink 22 is fixed on the lamp holder 10. An annular recess 222 is defined in a top of the heat sink 22. The heat transfer rod 24 is made of metal which can conduct heat, such as aluminum. The heat transfer substrate 30 is substantially disk-shaped. A mounting hole 32 is defined in a central portion of the heat transfer substrate 30. Threads are formed in the mounting hole 32. The light emitting unit 40 includes a plurality of LED light sources 42. The LED light sources 42 are arranged around the mounting hole 32 of the heat transfer substrate 30, and are evenly arranged on a top surface of the heat transfer substrate 30. The heat transfer substrate 30 is fixed in the annular recess 222 and thermally connected to the heat sink 22.

Please referring to FIG. 1 to FIG. 3, the lamp shell 50 is generally spherical sector shaped with a bottom thereof being open. The lamp shell 50 includes a lampshade 52 and a heat dissipation cover 54. The lampshade 52 forms an opening 522 at a top thereof. The heat dissipation cover 54 is generally circular. In assembly, the heat dissipation cover 54 is received in the opening 522, and is connected to the lampshade 52 to form the lamp shell 50. A bottom of the lampshade 52, i.e., the bottom of the lamp shell 50, is inserted in the annular recess 222 of the heat sink 22, and receives the heat transfer substrate 30 therein. The heat dissipation cover 54 is made of materials with high thermal conductivity, such as aluminum alloy. An outer diameter of the heat dissipation cover 54 is less than the maximum diameter of the lampshade 52, thus to avoid blocking all light of the light emitting unit 40 along an upward direction (as shown in FIG. 3). Light scattering material is evenly provided on the lampshade 54, for scattering light of the light emitting unit 40. The heat dissipation cover 54 and the heat transfer rod 24 are integrally formed as a whole, and cooperatively form a profile like an umbrella. An end of the heat transfer rod 24 is fixed in the mounting hole 32 of the heat transfer substrate 30, and thermally connected to the heat transfer substrate 30.

Please referring to FIG. 2 and FIG. 3, the reflecting unit 60 includes a reflecting board 62 adhered to a bottom surface of the heat dissipation cover 54. The reflecting board 62 faces the light emitting unit 40, for reflecting upwards light of the light emitting unit 40 downwardly. The reflecting unit 60 further includes a reflecting sleeve 64. The reflecting sleeve 64 is mounted around the heat transfer rod 24, thereby overcoming defects of the heat transfer rob which is metal and light-proof.

Heat dissipation of the LED illumination lamp 100 of the first embodiment of the present invention is: heat generated by the light emitting unit 40 during operation is transferred to the heat sink 22 through the heat transfer substrate 30, and then dissipated to environment by the heat sink 22. On the other hand, the heat transfer rod 24 transfers the heat from the heat transfer substrate 30 to the heat dissipation cover 54, and then dissipates to the environment through convection or radiation. Compared with general LED lamps, the LED illumination lamp 100 of the present invention has enlarged heat dissipation area and increased heat dissipation ways without substantially change in lamp structure, which results in improved heat dissipation efficiency, and extended life-span of the LED illumination lamp 100.

Figure 4:
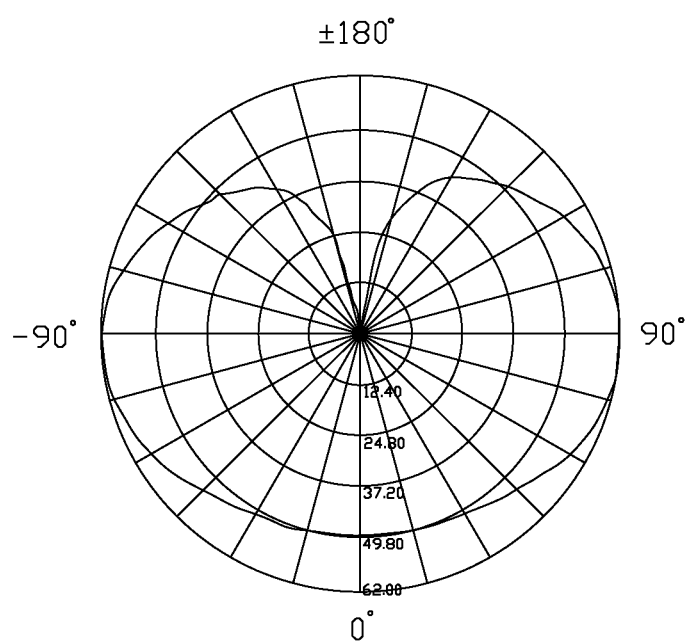
FIG. 4 shows light distribution curve of the LED illumination lamp of FIG. 1.

Please referring to FIG. 3, during operation of the LED illumination lamp 100, the light emitting unit 40 emits light upwards to the reflecting board 62, and then the reflecting board 62 reflects the light downwards to a position under the heat transfer substrate 30. At the same time, the reflecting sleeve 64 reflects the light thereon to different directions, and then is further scattered by the lamp shell 50, thus lighting environment around the LED illumination lamp 100. In addition, the lamp shell 50 has light scattering material thereon, and the outer diameter of the heat dissipation cover 54 is less than the maximum diameter of the lamp shell 50, which makes a portion of the lamp shell 50 near the heat dissipation cover 54 scatter light of the light emitting unit 40 upwards to supplement light blocked by the heat dissipation cover 54. Please referring to the light distribution curve of the present LED illumination lamp 100 shown in FIG. 4, in a direction of 0 degree, light intensity at an area blocked by the heat dissipation cover 54 is also strong, thus makes the LED illumination lamp 100 have an uniform light intensity. In addition, the reflecting board 62 reflects light of the light emitting unit 40 downwards, which enlarges lighting angle of the LED illumination lamp 100 to be about 320 degrees, and makes the LED illumination lamp 100 obtain omnidirectional lighting angle.

The first embodiment of the present invention can be further modified as follows: omitting the reflecting unit 60, forming reflecting layer on surfaces of the heat transfer rod 24 directly to replace the reflecting sleeve 64, and forming reflecting layer on the bottom surface of the heat dissipation cover 54 to replace the reflecting board 62, which can also reflect light to obtain omnidirectional lighting of the LED illumination lamp 100.

From above, the LED illumination lamp 100 of the present invention includes heat transfer rod 24 which thermally connects the heat transfer substrate 30 and the lamp shell 50 to transfer heat from the heat transfer substrate 30 to the lamp shell 50, compared with the prior art, heat dissipation area is enlarged, such that the present illumination LED lamp has the advantages of high heat dissipation efficiency. For the light scattering material formed on the reflecting unit 60 and the lamp shell 50, lighting angle of the present LED illumination lamp 100 is about 320 degrees, such that the present LED illumination lamp 100 is generally omnidirectional lighting.

Figure 5:
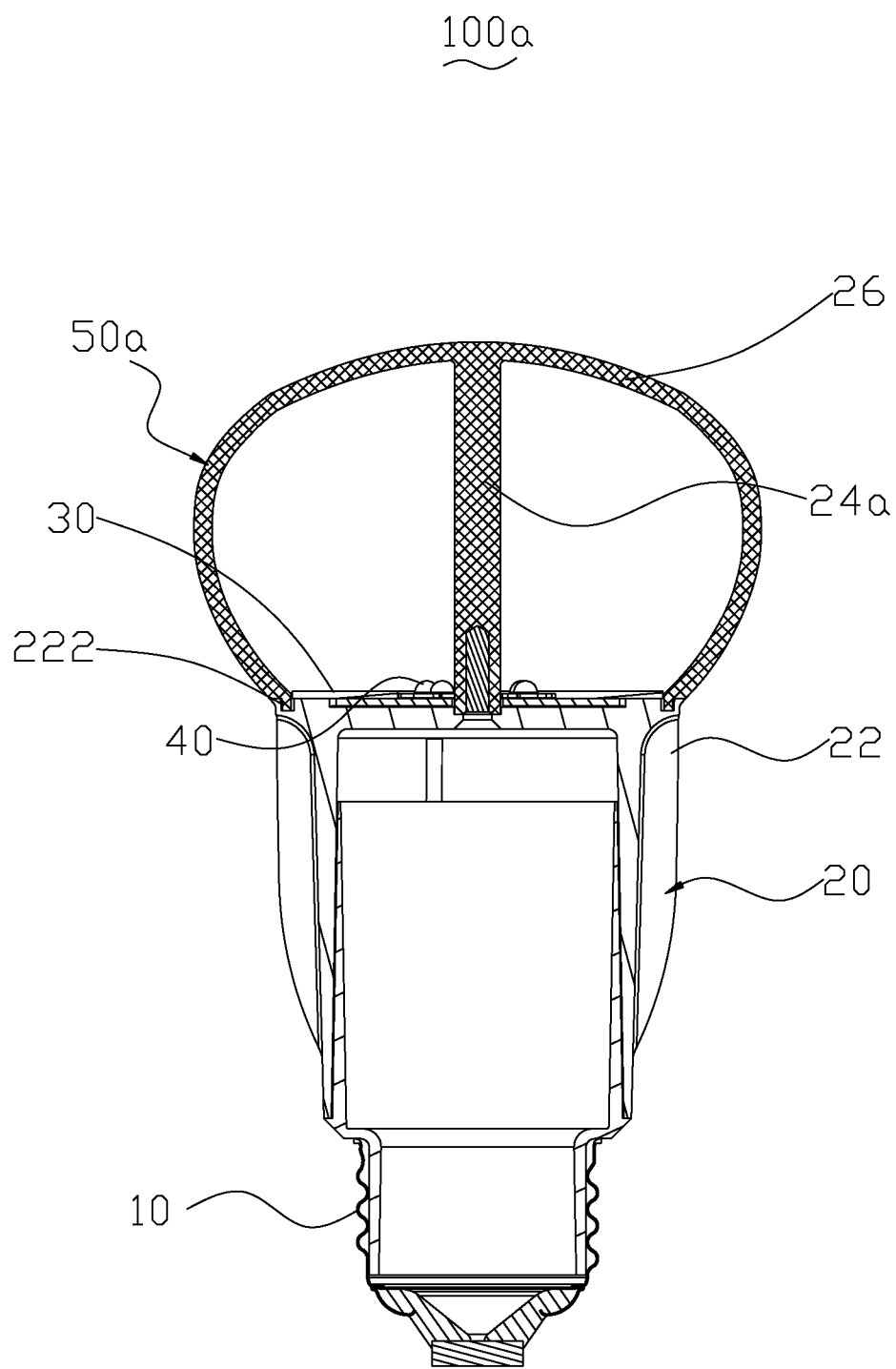
FIG. 5 is a schematic view of an LED illumination lamp in accordance with a second embodiment of the present invention.

Please referring to FIG. 5, which illustrates an LED illumination lamp 100a in accordance with a second embodiment of the present invention. The LED illumination lamp 100a is different from the first embodiment in that: the lamp shell 50a is made of transparent ceramic and integrally formed as a whole. One end of the heat transfer rod 24a is connected to the heat transfer substrate 30, and the other end is connected to the lamp shell 50a. For the heat conductivity coefficient of ceramic is about 180~220 W/M*K, the lamp shell 50a can efficiently dissipate the heat from the heat transfer rod 24a. In such situation, the lamp shell 50a does not need to be formed separately as the first embodiment, which simplifies the structure. Of course, in addition to use transparent ceramic, the lamp shell 50a can be made of other transparent materials with high thermal conductivity.

Figure 6:
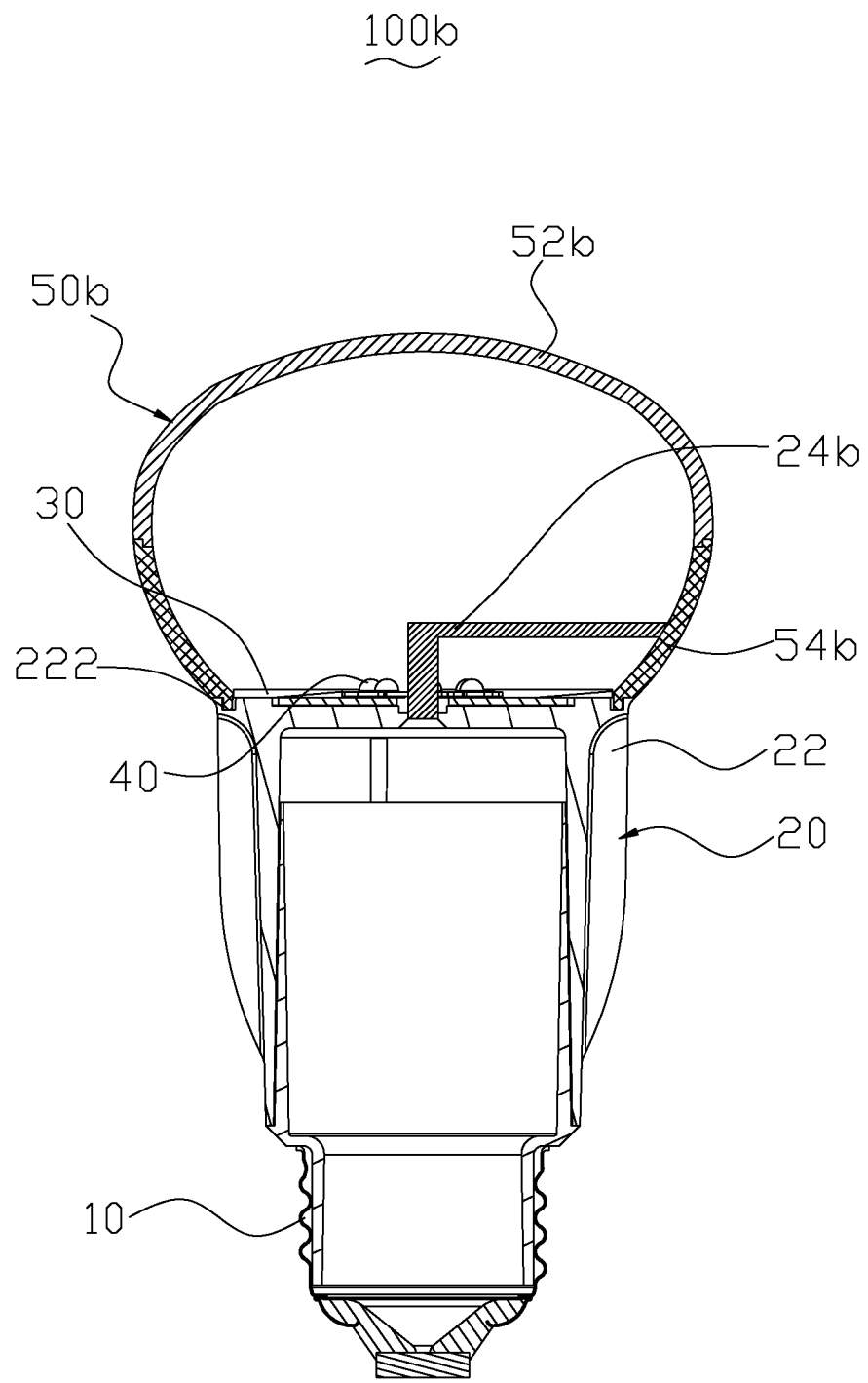
FIG. 6 is a schematic view of an LED illumination lamp in accordance with a third embodiment of the present invention.

Please referring to FIG. 6, which shows an LED illumination lamp 100b according to a third embodiment of the present invention, which is different from the first embodiment in that: the lamp shell 50b is generally spherical sector shaped with a bottom thereof being open, and includes a lampshade 52b at the top and a heat dissipation cover 54b at the bottom. The lampshade 52b is semisphere, and the heat dissipation cover 54b is circular corresponding to the lampshade 52b. The heat dissipation cover 54b is made of transparent ceramic. The heat transfer rod 24b is L-shaped. One end of the heat transfer rod 24b is connected to the heat transfer substrate 30, and the other end is connected to the heat dissipation cover 54b. During operation, the heat transfer rod 24b transfers heat from the heat transfer substrate 30 to the heat dissipation cover 54b. The heat dissipation cover 54b with high thermal conductivity improves the heat dissipation efficiency of the whole LED illumination lamp 100b. In addition, for the present LED illumination lamp 100b, the heat dissipation cover 54b can be made of light-proof metal when the maximum outer diameter of the heat dissipation cover 54b is less than the maximum outer diameter of the lampshade 52b and light scattering material is formed on the lampshade 52b. Thus, lighting angle does not reduce by blocking of the light-proof heat dissipation cover 54b for scattering of the lampshade 52b which is not covered by the heat dissipation cover 54b. Correspondingly, in such situation, more light should be emitted to the lampshade 52b which is connected to the heat dissipation cover 54b, making the light distribution curve of the LED illumination lamp 100b be more uniform.

The foregoing is considered to be illustrative of the principles of the present invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. An LED illumination lamp, comprising:
   a lamp shell;
   a light emitting unit;
   a heat transfer substrate, the light emitting unit being mounted on the heat transfer substrate; the lamp shell covering the light emitting unit; the lamp shell comprising a lampshade and a heat dissipation cover connected to the lampshade, the lampshade being located at a bottom of the lamp shell and receiving the heat transfer substrate, the heat dissipation cover being located at a top of the lamp shell; a reflecting board, the reflecting board being mounted at a bottom surface of the heat dissipation cover and facing the light emitting unit; a bottom of the lampshade receiving the heat transfer substrate, the outer diameter of the bottom of the lampshade being less than the maximum outer diameter of the lampshade; and
   a heat dissipation unit, the heat dissipation unit comprising a heat transfer rod, one end of the heat transfer rod being connected to the heat transfer substrate, and the other end of the rod being connected to the heat dissipation cover for transferring heat from the heat transfer substrate to the lamp shell.

2. The LED illumination lamp of claim 1, wherein the lamp shell is made of transparent ceramics with high thermal conductivity.

3. The LED illumination lamp of claim 1, wherein an outer diameter of the heat dissipation cover being less than the maximum outer diameter of the lampshade.

4. The LED illumination lamp of claim 1, wherein one end of the heat transfer rod is connected to a central portion of the heat transfer substrate, the light emitting unit comprising a plurality of LED light sources, the LED light sources surrounding the heat transfer rod.

5. The LED illumination lamp of claim 1, wherein a reflecting sleeve is mounted around the heat transfer rod.

6. The LED illumination lamp of claim 1, wherein light scattering material is formed on the lamp shell for scattering light of the light emitting unit.

7. The LED illumination lamp of claim 1, wherein the lampshade is semisphere, the heat dissipation cover is circular corresponding to the lampshade, and the lampshade and the heat dissipation cover cooperatively form the lamp shell with a bottom thereof being open.

8. The LED illumination lamp of claim 7, wherein light scattering material is formed on the lamp shell, the heat dissipation cover is arranged at a bottom of the lamp shell, and the outer diameter of the heat dissipation cover is less the maximum outer diameter of the lampshade.

9. The LED illumination lamp of claim 1, wherein the heat dissipation cover is made of materials with high thermal conductivity.

10. The LED illumination lamp of claim 1, wherein the heat dissipation cover and the heat transfer rod are integrally formed as a whole.

11. An LED illumination lamp, comprising:
a lamp shell;
a light emitting unit;
a heat transfer substrate; and
a heat dissipation unit;
the heat dissipation unit comprising a heat transfer rod and defining an annular recess for fixing the heat transfer substrate therein; the light emitting unit being mounted on the heat transfer substrate; the lamp shell covering the light emitting unit; the lamp shell comprising a lampshade at the top and a heat dissipation cover at the bottom, the heat dissipation cover being inserted into the annular recess and receiving the heat transfer substrate; a reflecting layer formed on the inner surface of the lampshade and facing the light emitting unit; the outer diameter of the bottom of the heat dissipation cover being less than the maximum outer diameter of the lampshade; one end of the heat transfer rod being connected to the heat transfer substrate, and the other end of the heat transfer rod being connected to the heat dissipation cover for transferring heat from the heat transfer substrate to the lamp shell.

12. The LED illumination lamp of claim 11, wherein the heat dissipation cover is made of transparent ceramics with high thermal conductivity.

13. The LED illumination lamp of claim 11, wherein the the heat dissipation cover can be made of light-proof metal when the maximum outer diameter of the heat dissipation cover is less than the maximum outer diameter of the lampshade.

14. The LED illumination lamp of claim 11, wherein the lampshade is coated with light scattering material.

15. The LED illumination lamp of claim 11, wherein the heat transfer rod is L-shaped.

16. The LED illumination lamp of claim 15, wherein the light emitting unit comprises a plurality of LED light sources, the LED light sources is surrounding the heat transfer rod.

17. The LED illumination lamp of claim 11, wherein the lamp shell is spherical sector, and the maximum outer diameter of the heat dissipation cover is less than the maximum outer diameter of the lamp shell.

* * * * *